June 30, 1953  D. C. BORTNER  2,643,760
ENDLESS CONVEYER
Filed May 2, 1951  3 Sheets-Sheet 1
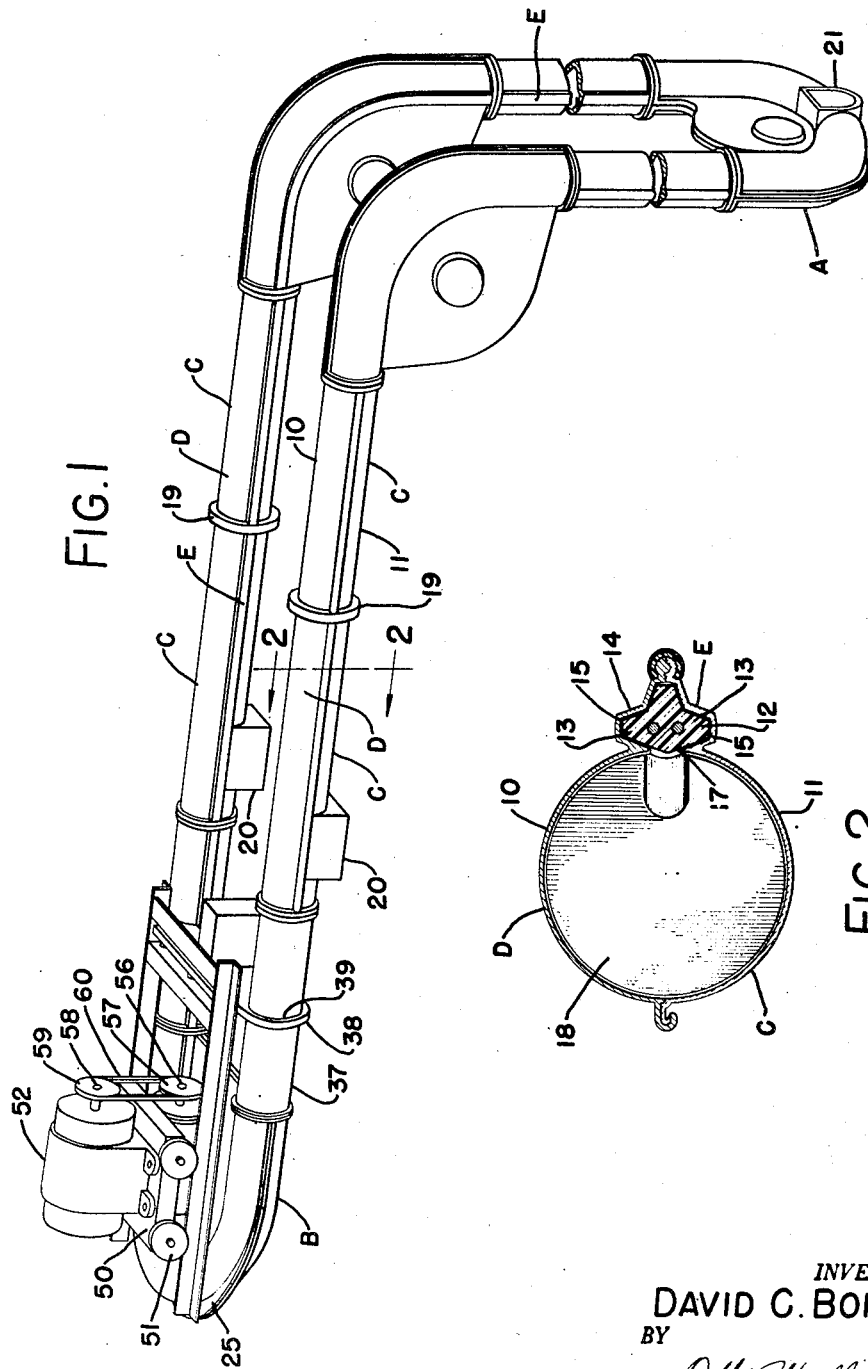
INVENTOR.
DAVID C. BORTNER
BY
Otto Moeller
Attorney June 30, 1953 — D. C. BORTNER — 2,643,760
ENDLESS CONVEYER
Filed May 2, 1951 — 3 Sheets-Sheet 2
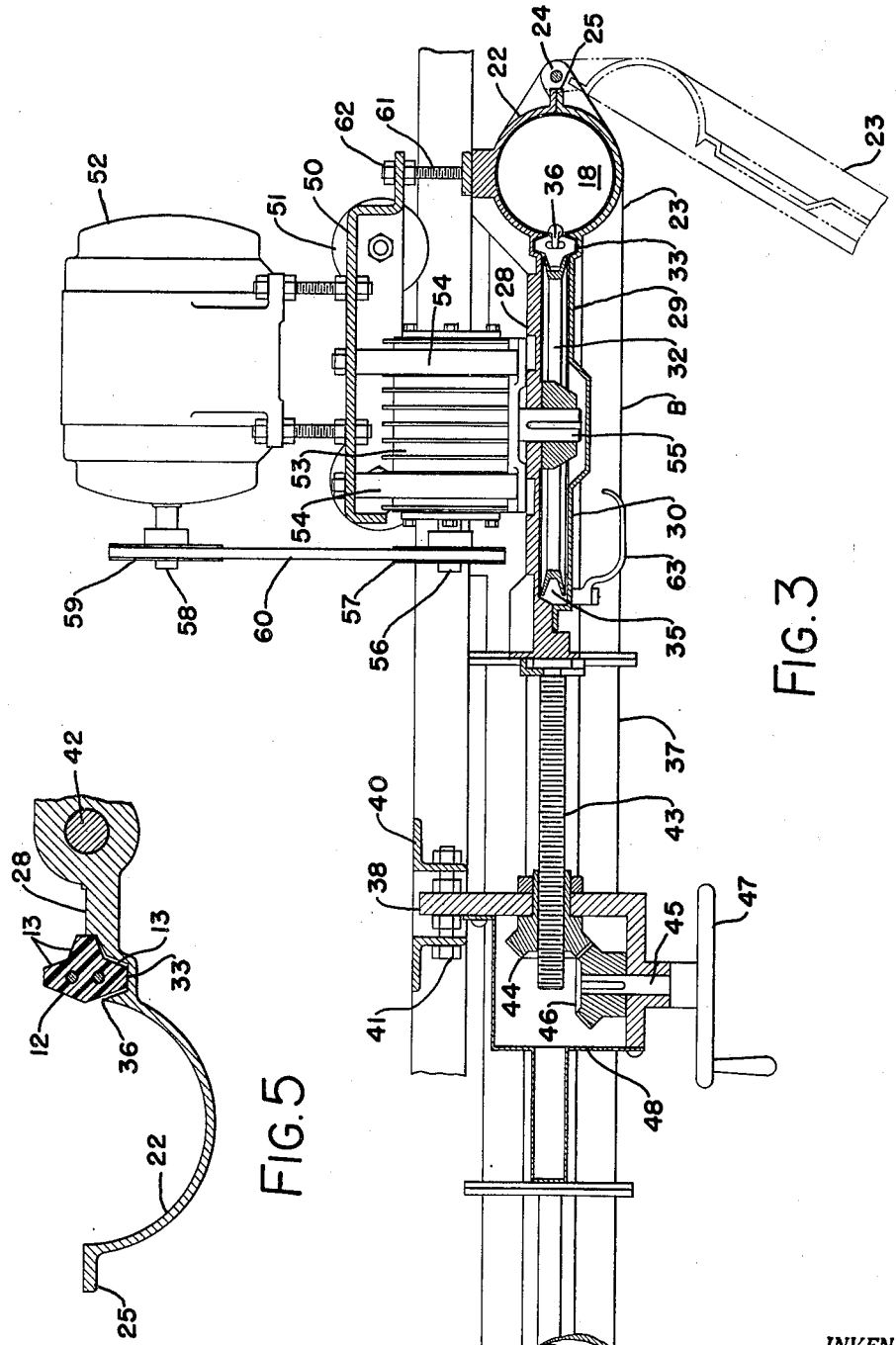
INVENTOR.
DAVID C. BORTNER
BY Otto Moeller
Attorney June 30, 1953

D. C. BORTNER 2,643,760

ENDLESS CONVEYER

Filed May 2, 1951

INVENTOR.
DAVID C. BORTNER
BY
Otto Maeller
Attorney

Patented June 30, 1953

2,643,760

UNITED STATES PATENT OFFICE 2,643,760

ENDLESS CONVEYER

David C. Bortner, York, Pa., assignor to Read Standard Corporation, a corporation of Delaware Application May 2, 1951, Serial No. 224,134

2 Claims. (Cl. 198—168)

This invention relates to conveyors for conveying flowable solid material and more particularly to suitable arrangements of conduits within which paddles or flights are positioned and caused to travel within said conduits in an endless path.

In the present invention the conduits or trough sections of the conveyor may be arranged in different planes to produce an endless conveyor, and as a result there will be turns at different degrees of curvature, and one of the objects of this invention is in the provision of a horizontal turn casing which may be adjusted to accommodate the length of the conveyor and to regulate the tension and tautness of the endless belt which carries the paddles or flights through the conveyor.

The invention consists of certain novel features of construction and combinations of parts which will be hereinafter described and pointed out in the claims.

In the accompanying drawings:

Figure 1 is a perspective view illustrating one form of the endless conveyor;

Figure 2 is a transverse sectional view through a trough section along lines 2—2 of Figure 1;

Figure 3 is a detail view in elevation and in vertical section of the horizontal turn casing and its mounting;

Figure 5 is a transverse vertical sectional view of one of the sections of the turn casing on the line 5—5 of Figure 4.

Figure 4:
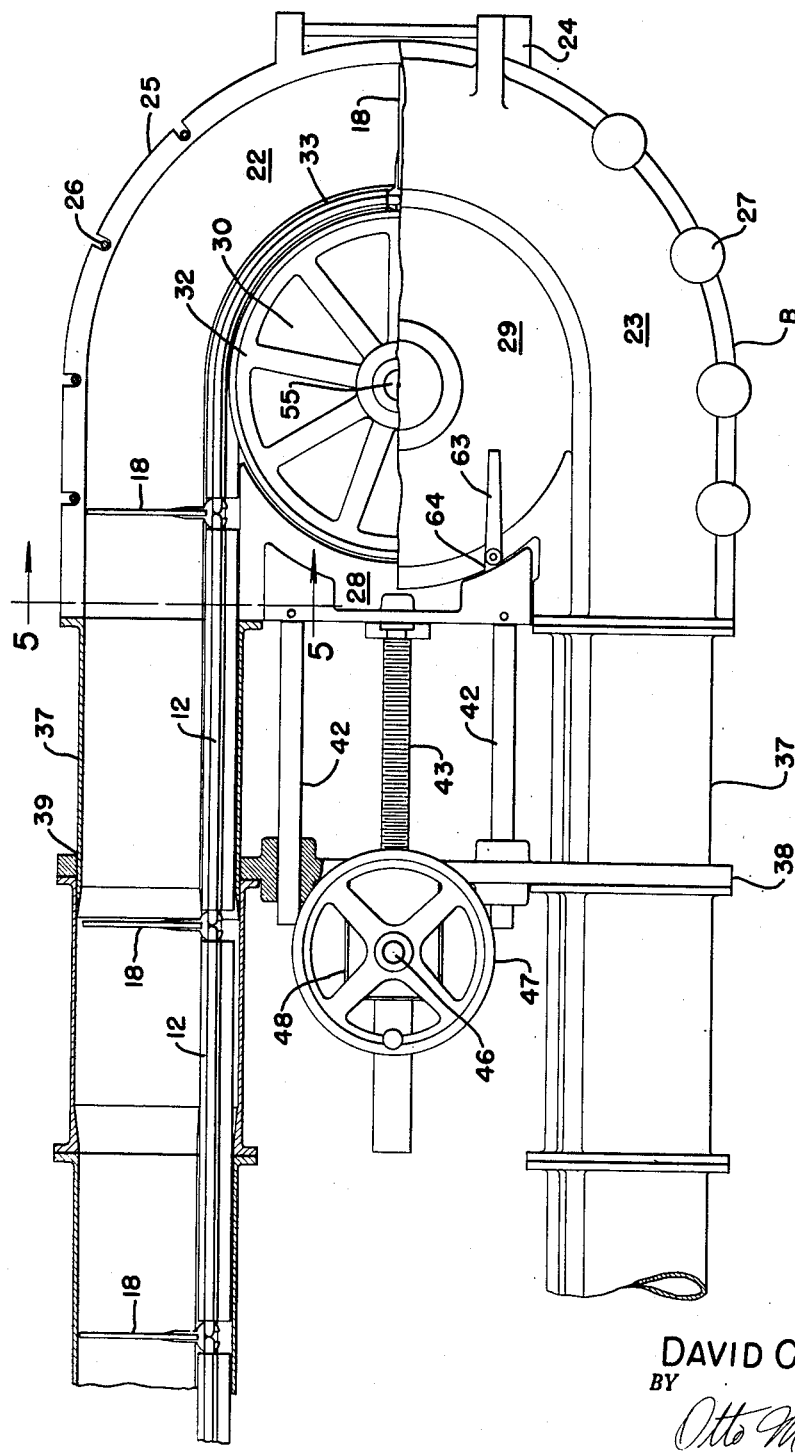
Figure 4 is a detail plan view of the horizontal turn casing partly in section taken from the lower side thereof.

In the drawings an illustration is shown of one arrangement of the conduits in providing an endless conveyor for conveying the material in a circuit having many directions and extending through a combination of horizontal, vertical and angular planes.

The conveyor is composed of a plurality of tubes or conduits C, in this instance arranged in parallelism, wherein the conduits are in sections, and each section consists of two longitudinal trough sections 10 and 11. Two trough sections when assembled together produce a tube D through which the material is conveyed. Each trough section 10 and 11 is provided with a longitudinal lateral extension 14, which extensions 14 of two superimposed trough sections, when brought together form a second tube E for an endless belt 12. The belt 12 is formed with four laterally projecting ribs 13, preferably equally spaced from one another.

Three of the ribs 13 are received in channels 15, formed longitudinally of the extensions 14, 14, and tube E for rigidly supporting the belt in its travel. The inner adjoining edges of the trough sections 10 and 11, where the two tubes D and E are joined are spaced from each other to produce a passage or slot 17 lengthwise of the tubes, and this passage or slot 17 is normally closed by one of the ribs 13 of the belt 12, except where the connection is made between the belt 12 and paddles 18, see Figure 4. Paddles or flights 18, are suitably spaced from each other and are disposed in the tube D, and are connected to the belt 12 through the passage or slot 17. The trough sections 10 and 11 are hinged together and are connected to adjacent sections by annular clamps 19. Certain of the trough sections are provided with discharge outlets 20.

The ends of the parallel conduits are connected at one of their ends by a horizontal turn casing B and at their opposite ends by a vertical turn casing A. The casing A is provided with an intake opening 21. The casings A and B are substantially alike, so that a description of one will suffice.

The horizontal turn casing B, Figures 3 and 4, consists of a tubular member formed into a turn of 180°, or substantially U-shape, which is divided longitudinally into an outer trough member 22 and an inner trough member 23, which are pivoted together at their outer edge and substantially midway of their length by a hinge 24. The outer edge of each member is provided with a flange 25, and these flanges are held together by bolts 26 and hand knobs 27 having screw threaded engagement with each other.

The outer and inner trough members when in superposed relation form a continuation of the tube D for conducting the flour or other material in its circuit through the conveyor. The trough members 22 and 23 are each provided with a web 28 and 29, respectively, which fills the U-shaped space between the legs of the casing B. The webs 28 and 29 are each provided with a circular recess 30 to afford sufficient clearance for a sheave 32 journalled therebetween. Arranged at the outer edges of each web 28, 29, is an arc-shaped groove 33, which extends outwardly from the inner surface of each web, and is disposed adjacent the trough members 22, 23. The grooves 33 when in registry form a continuation of the tube E for the belt 12.

The inner edges of the trough members 22, 23 adjacent the grooves 33 of the webs 28, 29 are arranged in spaced relation for forming a slot or passage 36 throughout the length of the trough members or casing.

A rib 13 of the belt 12 is received in each groove 33 of the webs 28, 29, and another rib is received in the groove 35 of the sheave 32, while a fourth rib normally closes the passage or slot 36 between the trough members of turn casing B and the grooves 33 of webs 28, 29. The passage or slot 36 also allows for the travel of the paddles or flights 18 which are carried by the belt 12. The grooves 33 in the webs 28, 29 are arranged adjacent the trough members 22, 23, so that the belt 12 with its several ribs acts as a seal against the flour or material from seeping into the chamber or recesses 30 provided in the webs for the sheave 32 and interfering with the rotation of the sheave.

Connecting the open ends of the turn casing B with respective conduits C are telescopic conduits 37 which conduits 37 have an internal contour similar to the internal contour of the ends of conduits C and turn casing B. A saddle 38 is provided with openings 39 at its ends for the reception of one of the telescopic sections of each of the conduits 37, and to which saddle the other of the telescopic sections of each of the conduits 37 are connected. The saddle 38 is supported from a superstructure 40 by means of a bolt 41. Guide rods 42, 42 are connected to the web 28 of the turn casing B and extend through guide holes in the saddle for stabilizing the casing.

A screw threaded shaft 43 extends from the web 28 of the casing and has threaded engagement with the bore of a bevel gear 44 journaled in the saddle 38. A stub shaft 45 is journaled in the saddle and extends downwardly therefrom, and is provided at one end with a gear 46 which meshes with gear 44 and at its opposite end is provided with a wheel 47. Upon the rotation of the wheel 47, the casing B can be moved from and toward the conduits C, by means of the threaded shaft 43 and telescopic fit between the conduit sections of conduit 37. A suitable gear housing 48 is carried by the saddle 38 for housing the gears and end of shaft 43.

A platform or carriage 50 is provided with wheels 51, 51 which travel on the superstructure 40, and mounted on the platform is a motor 52. A gear box 53 is suspended from the platform 50 by means of straps 54. The gear box 53 rests upon the web 28 of the housing B, and extending from the gear box is a driven shaft 55, which extends through the web 28 and to which the sheave 32 is splined or keyed. A drive shaft 56 associated with the driven shaft 55 is journaled in the gear box 53 and is provided with a pulley 57. The motor 52 is provided with a shaft 58 upon which is mounted a pulley 59. A belt 60 passes over the pulleys 57 and 59 for transmitting power from the motor to the sheave 32 for driving the belt 12 through its circuit in the conveyor.

The outer member 22 of casing B is supported by the platform 50 by a screw threaded stem 61 and nuts 62. When there is any adjustment of the belt 12 or housing B by the hand wheel 47 through shaft 43, the motor 52 and its carriage 50 will be shifted with the casing B.

The inner member 23 is adapted to be swung downwardly as indicated in Figure 3, by dotted lines, when it is necessary to examine or clean the conveyor and turn casings, and to adjust the sheave 32 and belt 12. The member 23 is normally held in closed position by the handles 63, which are provided with latch members 64 for engagement with a slot in the wall of the web 28.

The turn casing A is similar to the casing B, and is provided with a sheave (not shown) which is journaled therein and over which belt 12 travels, but in this instance the power motor 52 has been mounted for driving the sheave of the casing B.

I claim:

1. In an endless tubular conveyor, the combination of a curviform-shaped tubular turn casing divided into two complementary sections, each of said sections having a web, a curviform-shaped groove formed on and conforming to the peripheral contour of each of said webs, a trough connected to said webs and conforming to the peripheral contour of each of said grooves, said webs, grooves and troughs in superposed relation providing two tubular passages about said webs, a sheave mounted for rotation between said webs, said troughs having their inner edges spaced apart to provide a slot lengthwise of said troughs, a belt received in and supported by said grooves and having engagement with said sheave, said grooves maintaining said belt in engagement with the walls of said slot to provide a seal between said troughs and said grooves, and flights in said troughs connected to said belt.

2. In an endless tubular conveyor, the combination of a curviform-shaped tubular turn casing horizontally divided into two complementary sections, each of said sections having a web, curviform grooves formed on each of said webs along the peripheral contour of said webs, curviform troughs connected to said webs and extending outwardly beyond said grooves and arranged in parallelism thereto, said grooves and troughs disposed in the same horizontal plane, said webs, grooves and troughs in superposed relation providing two parallel tubular passages about said webs, said troughs having their inner edges spaced apart to provide a slot lengthwise of said troughs, a sheave mounted for rotation between said webs with the periphery thereof adjacent said slot, a belt having a plurality of ribs, two of said ribs received in and supported by said grooves, a third rib of said ribs having engagement with the periphery of said sheave, said grooves maintaining said belt in engagement with the walls of said slot to provide a seal between said troughs, and flights in said troughs connected to said belt.

DAVID C. BORTNER.

References Cited in the file of this patent

UNITED STATES PATENTS

| Number | Name | Date |
|---|---|---|
| 2,095,315 | Crocker | Oct. 12, 1937 |
| 2,110,204 | Davis | Mar. 8, 1938 |
| 2,245,073 | Hapman | June 10, 1941 |
| 2,383,932 | Brunner | Sept. 4, 1945 |
| 2,571,444 | Hapman | Oct. 16, 1951 |